Jan. 20, 1925.  1,523,878
T. J. KELLY
MECHANISM AND METHOD OF OPERATING ON CORDS OR THREADS
Filed July 28, 1921   9 Sheets-Sheet 1
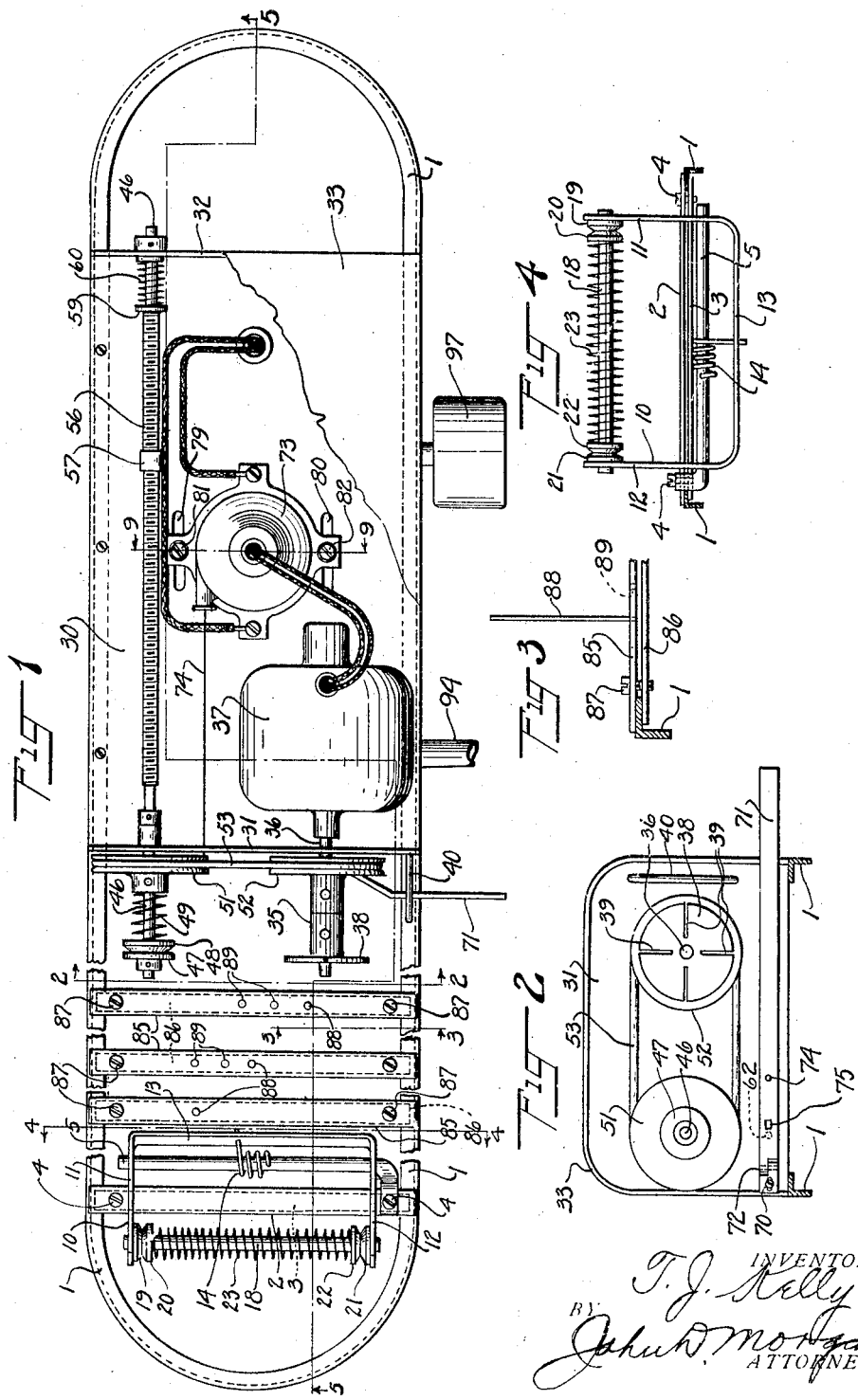

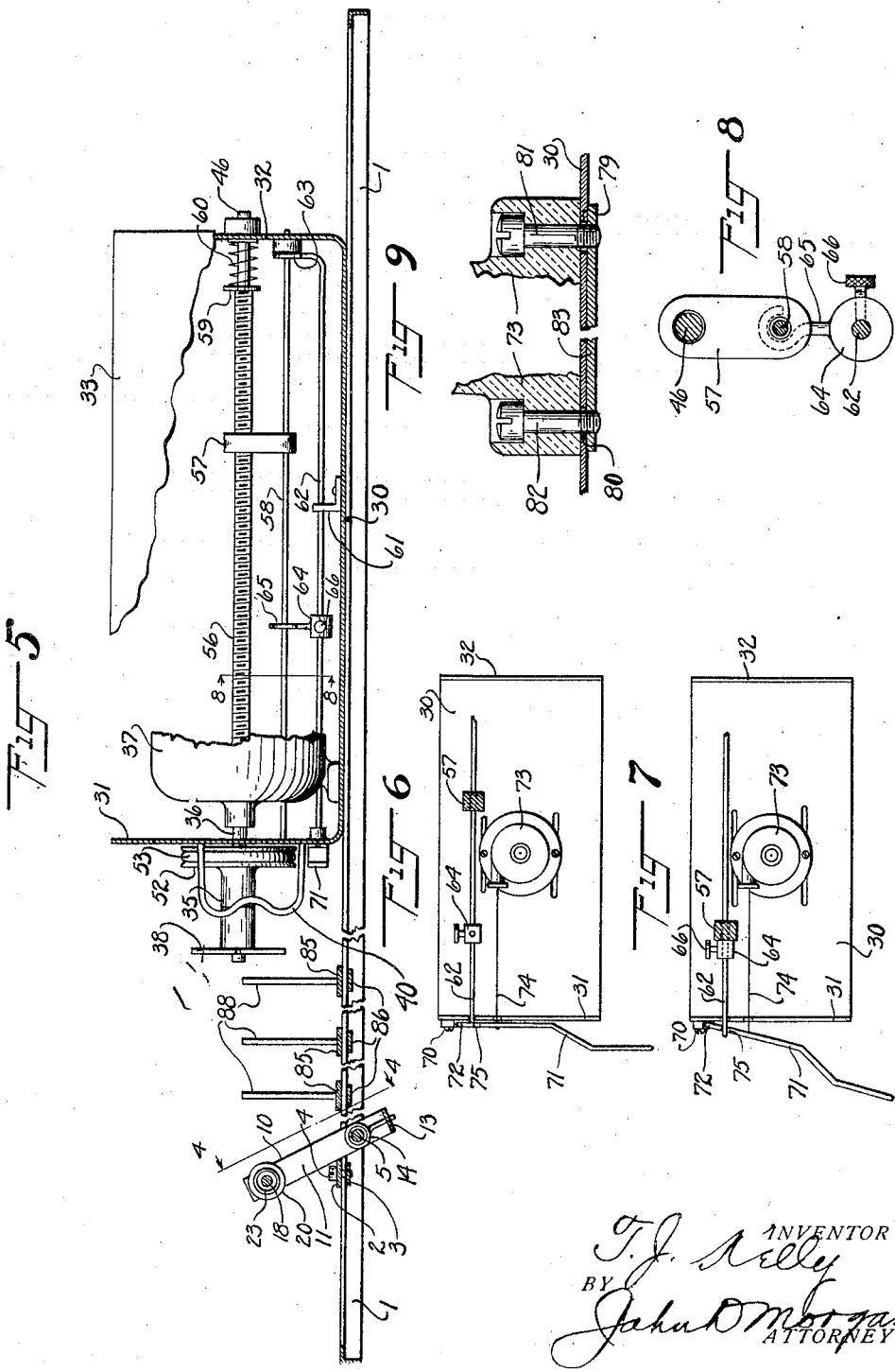

Jan. 20, 1925.
T. J. KELLY
1,523,878
MECHANISM AND METHOD OF OPERATING ON CORDS OR THREADS
Filed July 28, 1921     9 Sheets-Sheet 3
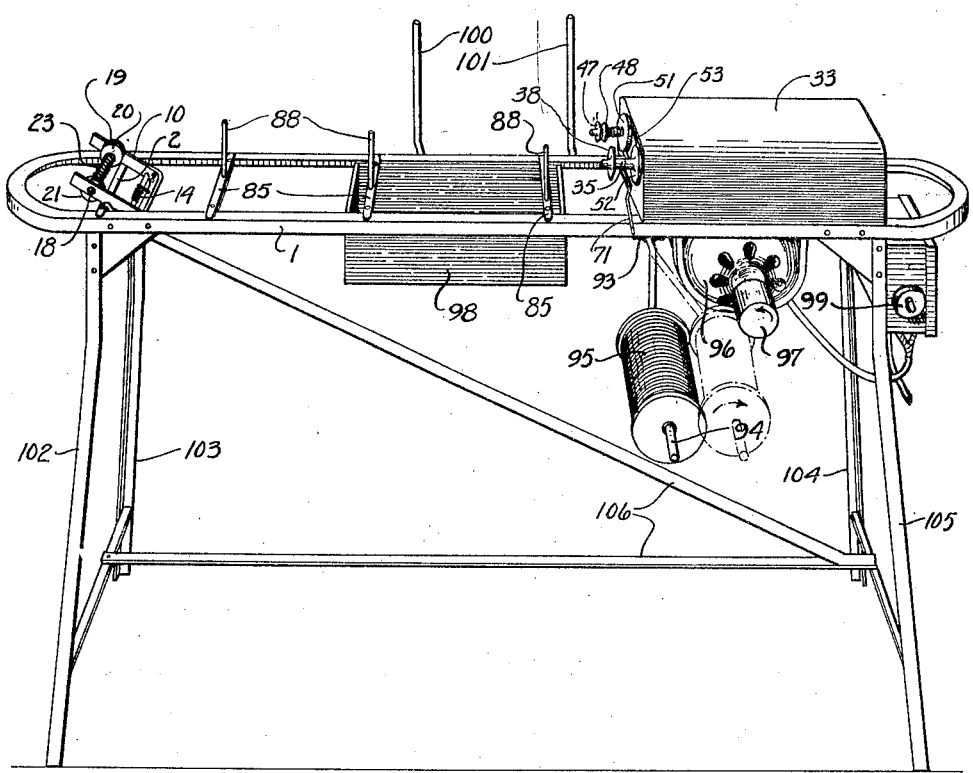
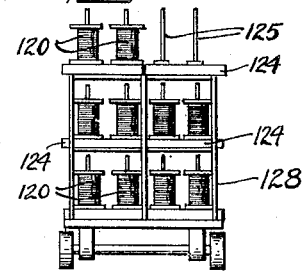
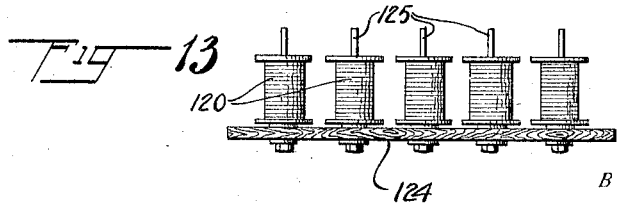

Jan. 20, 1925.
T. J. KELLY
1,523,878
MECHANISM AND METHOD OF OPERATING ON CORDS OR THREADS
Filed July 28, 1921   9 Sheets-Sheet 4
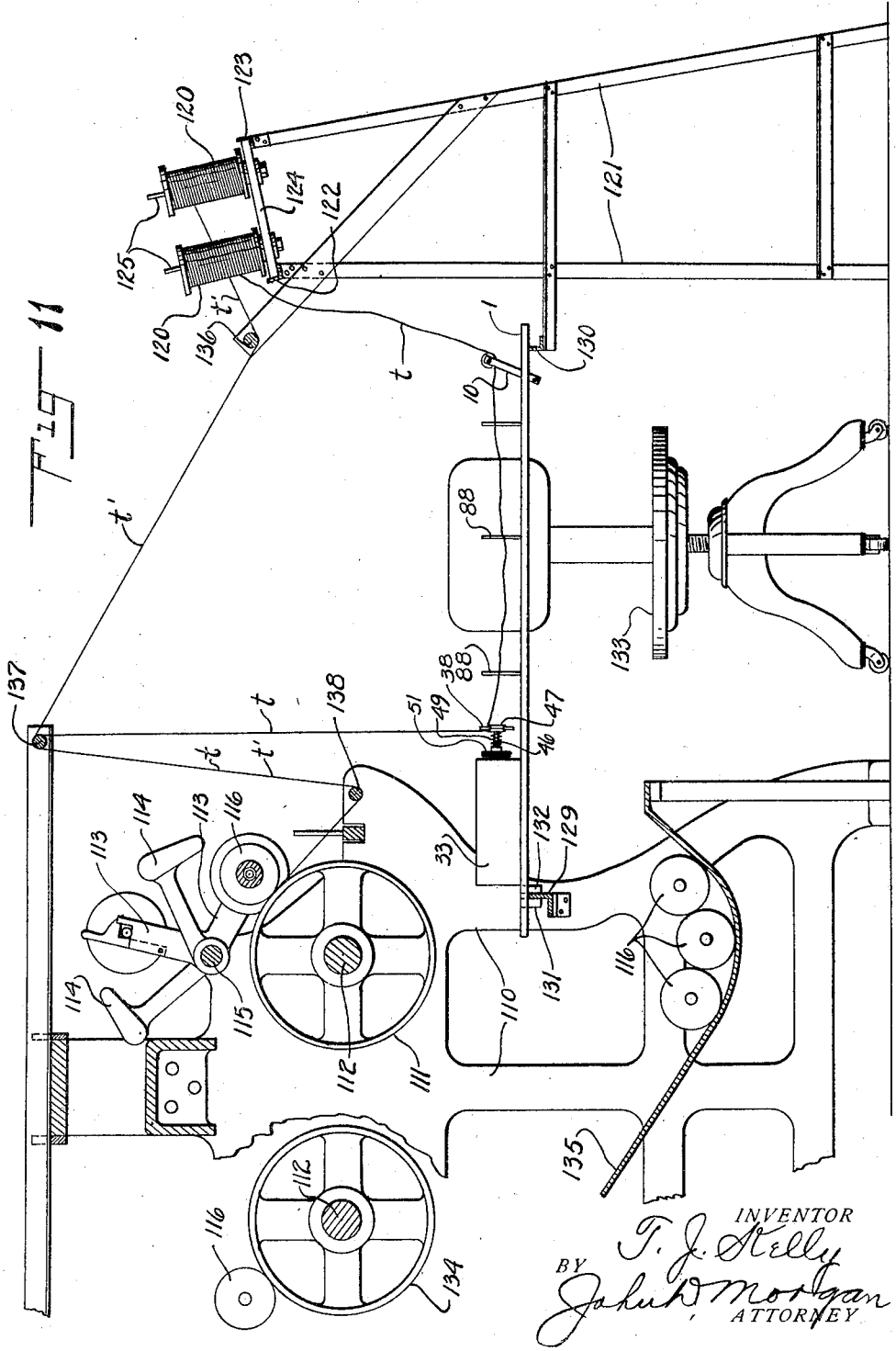

Jan. 20, 1925.  1,523,878
T. J. KELLY
MECHANISM AND METHOD OF OPERATING ON CORDS OR THREADS
Filed July 28, 1921   9 Sheets-Sheet 5
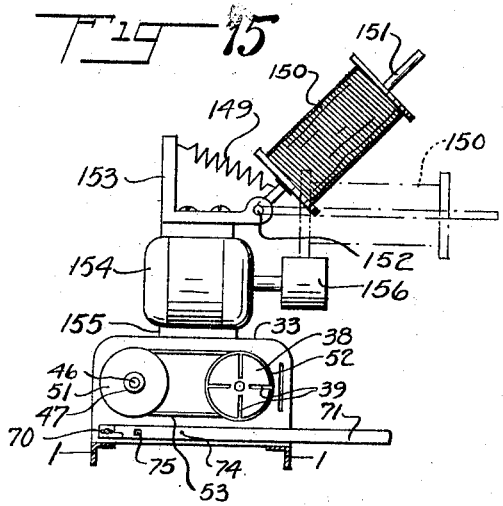
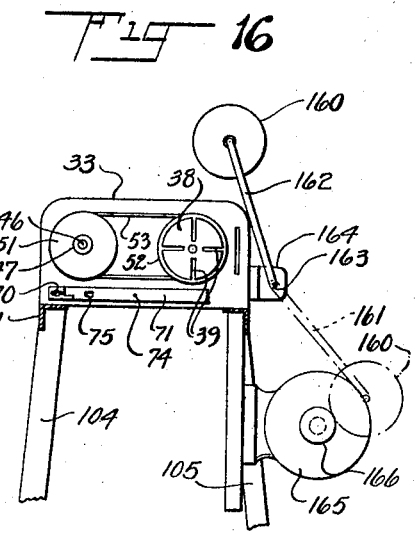
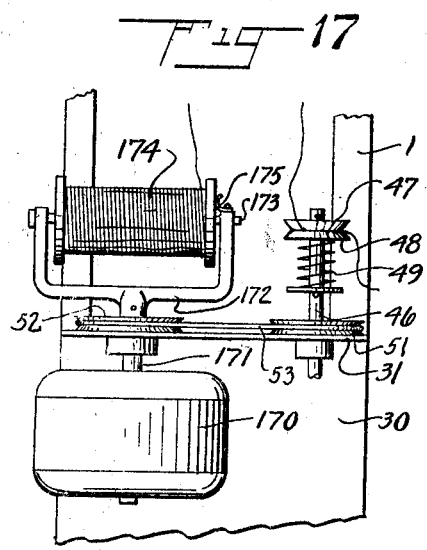
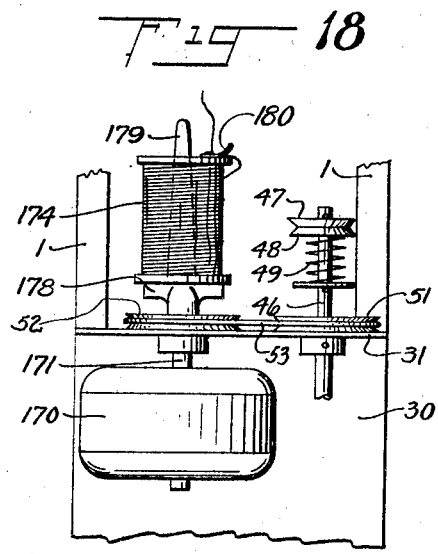
INVENTOR
T. J. Kelly
BY John D. Morgan
ATTORNEY Jan. 20, 1925.
T. J. KELLY
1,523,878
MECHANISM AND METHOD OF OPERATING ON CORDS OR THREADS
Filed July 28, 1921  9 Sheets-Sheet 6
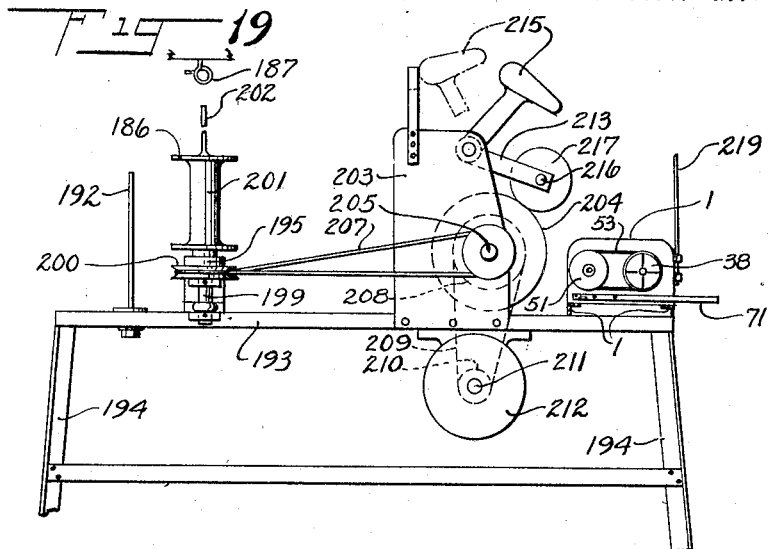
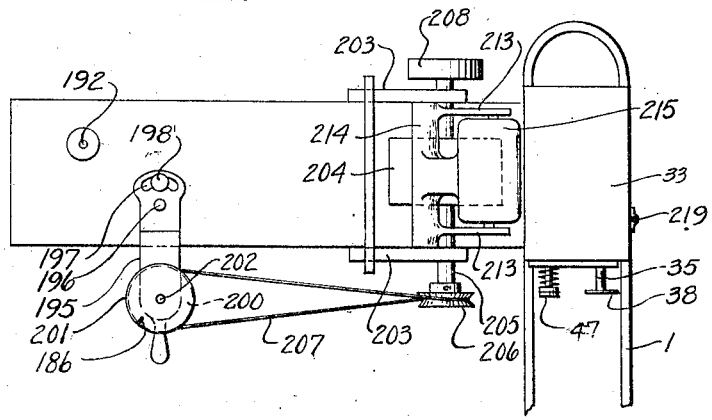
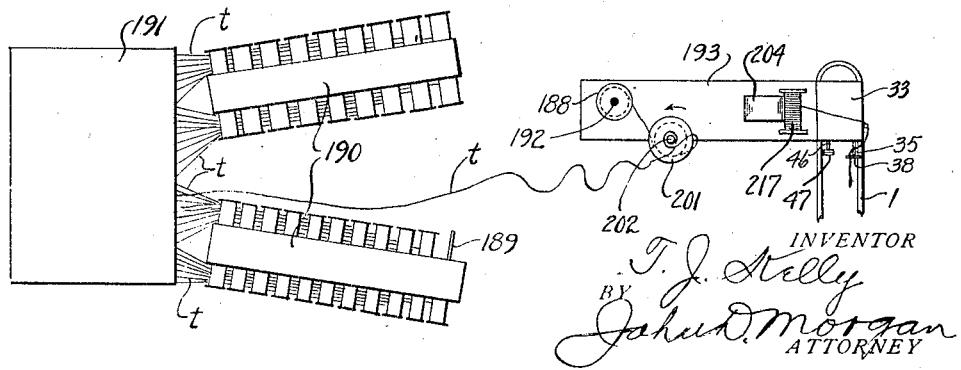
INVENTOR
T. J. Kelly
BY John D. Morgan
ATTORNEY Jan. 20, 1925.  1,523,878
T. J. KELLY
MECHANISM AND METHOD OF OPERATING ON CORDS OR THREADS
Filed July 28, 1921   9 Sheets-Sheet 7
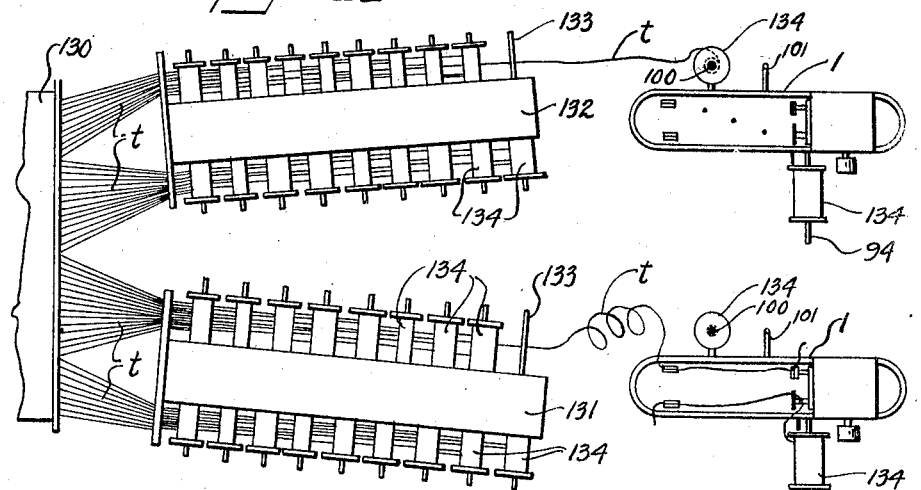
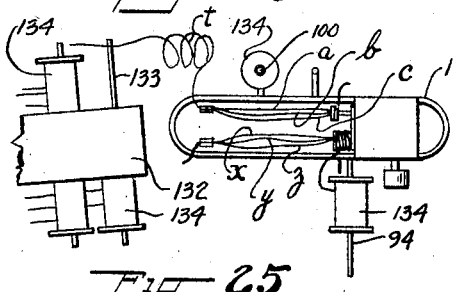
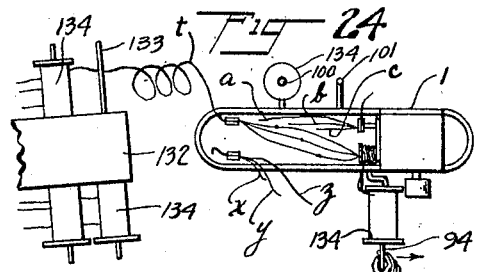
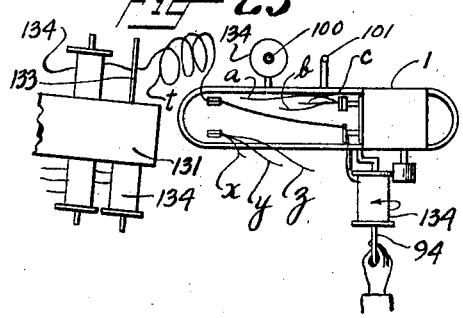
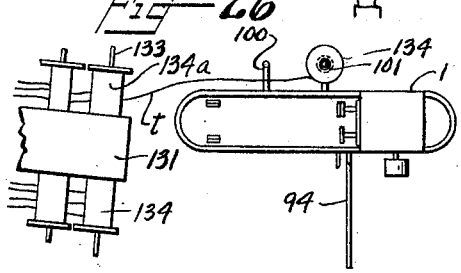
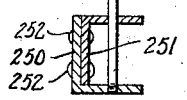
INVENTOR
T. J. Kelly
BY John D. Morgan
ATTORNEY

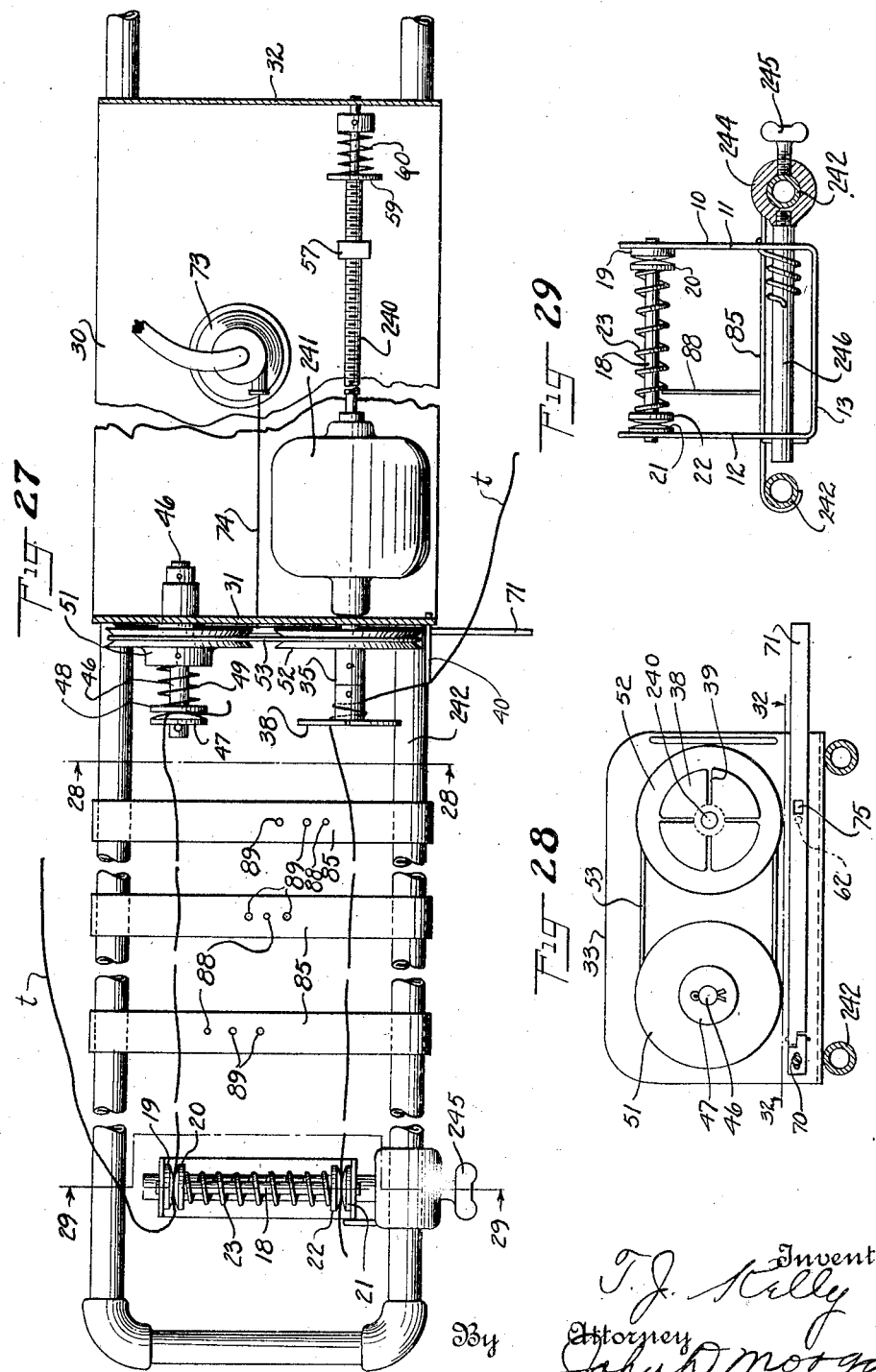

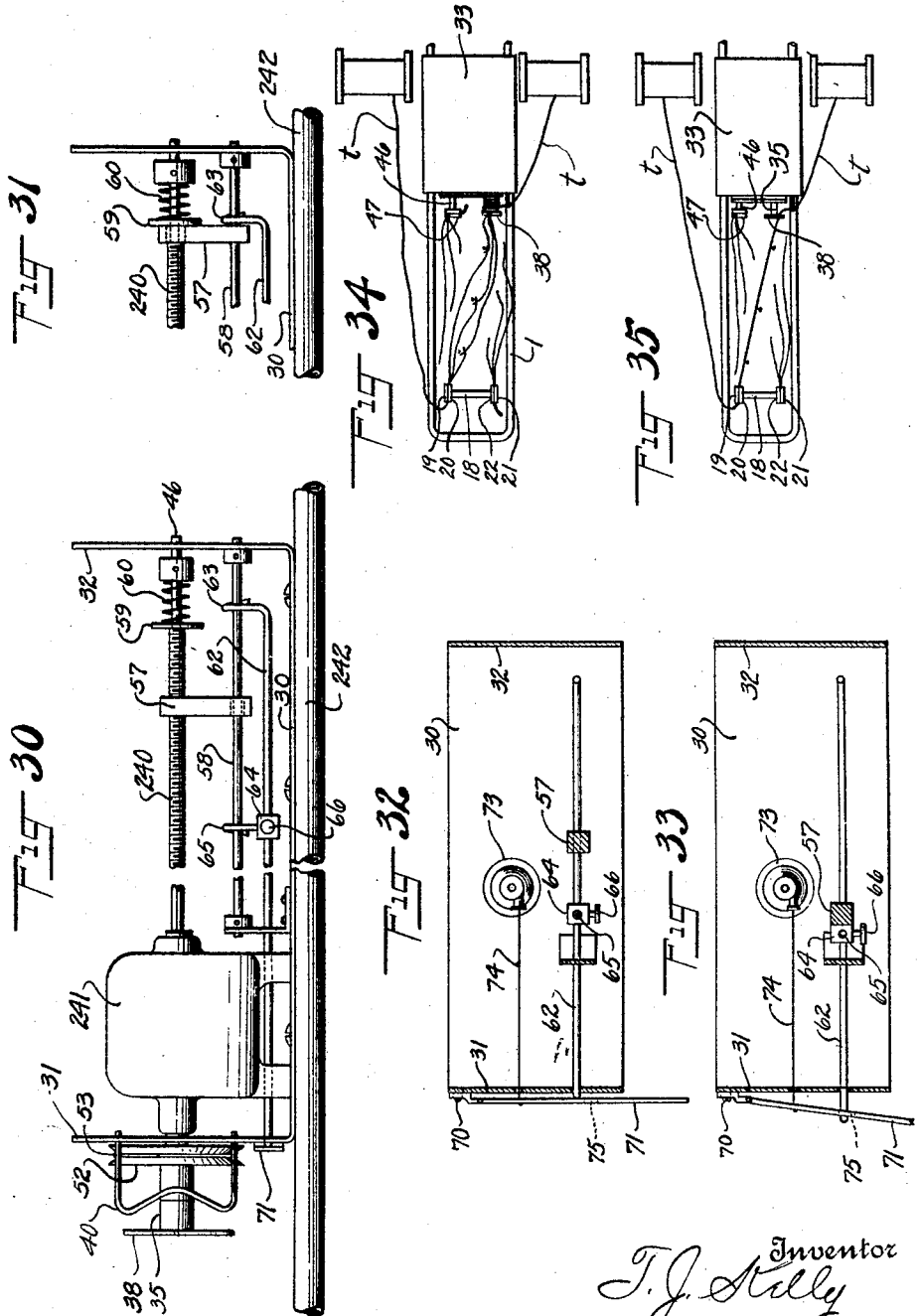

Patented Jan. 20, 1925.

1,523,878

UNITED STATES PATENT OFFICE.

TIMOTHY J. KELLY, OF PASSAIC, NEW JERSEY, ASSIGNOR TO BRIGHTON MILLS, A CORPORATION OF NEW JERSEY.

MECHANISM AND METHOD OF OPERATING ON CORDS OR THREADS.

Application filed July 28, 1921. Serial No. 488,178.

*To all whom it may concern:*

Be it known that I, TIMOTHY J. KELLY, a citizen of the United States, residing at Passaic, in the county of Passaic and State of New Jersey, have made certain new and useful Improvements in Mechanism and Methods of Operating on Cords or Threads, of which the following is a specification.

The invention relates to novel methods and mechanisms for uniting threads or yarns, and for performing other operations thereon, in or preparatory to weaving or other textile or cordage work or operations, and more especially to mechanisms and methods for uniting the ends of threads or yarns by substantially smooth and invisible knots, preparatory to weaving or other textile or cordage operations, and also in handling the spools or reels in connection with the thread uniting, and otherwise, to secure high efficiency in the mechanisms, and a consequently relatively large output.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a top plan, with parts broken away, on the machine embodying the invention;

Fig. 2 is a vertical transverse section on the line 2—2 of Fig. 1, showing the untwisting and retwisting devices;

Fig. 3 is a fragmentary transverse vertical section on the line 3—3 of Fig. 1, showing one of the knot locating standards;

Fig. 4 is a transverse vertical section on the line 4—4 of Figs. 1 and 5, showing the clamping and tensioning devices;

Fig. 5 is a longitudinal section, with parts in elevation and parts broken away, taken on the line 5—5 of Fig. 1, and showing especially the automatic controls for the untwisting and retwisting means;

Fig. 6 is a top plan, of greatly reduced size, and more or less diagrammatic, of the automatic switch control for the untwisting and retwisting devices;

Fig. 7 is a similar view, showing the same devices in a different position;

Fig. 8 is a vertical section, greatly enlarged, taken on the line 8—8 of Fig. 1;

Fig. 9 is a fragmentary sectional detail, with the central part broken away, taken on the line 9—9 of Fig. 1, and showing the longitudinal adjustment for the switch which controls the untwisting and retwisting motor;

Fig. 10 is a perspective front elevation showing the machine of Fig. 1 mounted on legs so as to be movable about the floor, and showing more fully the preferred form of retwisting mechanism;

Fig. 11 is a vertical transverse elevation, partly in section, and more or less diagrammatic, showing the cord or thread uniting mechanism cooperating with a back winder;

Fig. 12 is a top plan detail of the spool holder shown in the upper right-hand part of Fig. 11;

Fig. 13 is a side elevation of the spool holder shown in Fig. 12;

Fig. 14 is a diagrammatic view of a plurality of the spool holders mounted in a truck or carrier;

Fig. 15 is an elevation of a modified form of a part of the retwisting mechanism;

Fig. 16 is a similar view of another modified form of the retwisting mechanism;

Fig. 17 is a fragmentary top plan of another modified form of a part of the untwisting and retwisting mechanism;

Fig. 18 is a fragmentary top plan of another modified form of the untwisting and retwisting mechanism;

Fig. 19 is a side elevation, more or less diagrammatic, and with parts in section, of a modified form of back winder and untwisting and retwisting mechanism;

Fig. 20 is a top plan corresponding to Fig. 19;

Fig. 21 is a diagrammatic plan showing the mechanism of Figs. 19 and 20 in its relation to the creels and loom;

Fig. 22 is a diagrammatic plan showing the relation of the machine of Figs. 1 or 10 to the creels and loom, and showing in the top part the first stage of the cord or thread uniting operation of the figure, and in the bottom part of the figure the second stage thereof;

Fig. 23 is a fragmentary diagram, corresponding to a part of the right-hand side of Fig. 22, and showing the next stage in the cord uniting operation;

Figs. 24, 25, and 26 are similar diagrams showing successive stages in the cord-uniting operation;

Fig. 27 is a fragmentary top plan showing a modified form of the mechanism or machine of Fig. 1;

Fig. 28 is a transverse vertical section taken on the line 28—28 of Fig. 27, showing a part of the untwisting and retwisting mechanism;

Fig. 29 is a transverse vertical section, taken on the line 29—29 of Fig. 27, showing the tensioning device;

Fig. 30 is a fragmentary elevation of the right hand half of Fig. 27, looking thereat from the bottom of the figure;

Fig. 31 is a fragmentary elevation of the right hand part of Fig. 30, showing the mechanism in a different position;

Figs. 32 and 33 are diagrammatic plans of the automatic switch control for the untwisting motor, shown in two different positions thereof, and corresponding generally to Figs. 6 and 7;

Fig. 34 is a top diagrammatic plan of the machine of Fig. 27, showing the untwisted and tied strands of the two cords;

Fig. 35 is a view similar to Fig. 34 but showing the retwisted and united cord or thread; and Fig. 36 is a fragmentary detail of one form of mounting a spool spindle on the thread support.

The present invention is directed to improved mechanisms and methods for efficiently and rapidly uniting the ends of cords or threads to be used in weaving fabrics, especially fabrics wherein special features are required, such as heavy and knotless cords or threads (cord fabric for automobile tires being an example), and for expeditiously and efficiently performing the cord or thread uniting operation and other operations for the purpose of increasing the output of the loom or other producing machines.

In accordance with one feature thereof, the invention has in view the uniting of the ends of two cords or threads without knots or other protuberances or irregularities and at the same time preserving the strength, size, twist and appearance of the cords or threads at the place of juncture, so as to avoid impairment of the fabric. In this respect the machine of the present application is an improvement on that of application Serial Number 460,725 of William Pearson and Timothy J. Kelly, filed April 12, 1921.

In other features of the invention it is directed to easy, expeditious and otherwise efficient handling of the cords and spools in connection with the creels, looms, backwinders and thread-uniting machines, so as to increase the output of the machines and at the same time improve the quality of the fabric or other manufacture.

The invention in the various aspects thereof, has wide application in the textile art, but it will be described exemplarily herein, as being applied to the winding of the thread of small spools upon large spools and the related operations, and also to the uniting of the thread of large spools to the thread of spools on the creels and leading directly into the loom.

Other features of the invention will be first disclosed in connection with the detailed description of the present preferred embodiment; and it will be understood that the preceding statment, as well as those following, are explanatory and exemplary of the invention and not restrictive thereof.

Referring now to the details of the embodiment of the invention illustrated by way of example in the accompanying drawings (Figs. 1 to 9), the machine is provided with a light but strong frame 1, composed preferably of angle iron of generally oblong form, having parallel sides and rounded ends, and preferably made endless through welding or uniting in other suitable manner. The frame is therefore light but strong and rigid, and is adaptable for use with and without legs or a similar support, so that it may either be supported on another machine, or may be supported on the floor at a suitable height thereabove and so as to be freely movable therealong. The various parts of the machine are preferably detachably supported upon this frame 1 by suitable means such as clamping screws and other screws.

Referring now in detail to the devices or mechanism for clamping and tensioning the thread preparatory to untwisting, and to certain devices which participate in the foregoing operations and also in the thread untwisting, a support is provided carried on the frame 1 and positionable or adjustable therealong in a direction longitudinally of the frame. This support comprises a transverse bar 2, (Figs. 1, 4, 5 and 10) resting upon the horizontally-disposed part of the frame 1, and also a similar transverse bar 3, engaging on the under side of the frame 1. Clamping screws 4 serve to clamp the bars 2 and 3 against the opposite side of the horizontal part of frame 1 to hold the bars firmly in any desired adjusted position.

Mounted on the bar 2 is a cylindrical rod 5, extending transversely and nearly across the frame 1. A cord or thread clamping device (Figs. 1, 4, 5 and 10) is mounted upon the rod 5 so as to be angularly or rotatably movable thereon under spring tension to place the threads to be united under tension and to compensate for the varying lengths of the threads through untwisting and retwisting. As embodied, a U-shaped frame 10 has side reaches 11, 12 and a bottom reach 13. The side reaches 11 and 12 are apertured near their bottom parts to receive the rod 5, whereby they are swingably mounted thereon. A spring 14 is coiled about the rod 5 with one end fixed thereto and the other end passing through the reach 13 of the frame 10. This mounting is for the purpose of placing the thread clamps under tension.

Mounted upon the frame 10 are two clamping devices for clamping, respectively, the two threads which are to be united. As embodied, there is mounted in the upper end of the frame 10 a rod 18. Upon rod 18, at one end thereof, is a circular beveled clamping member 19, and a like member 20, which are resiliently pressed together, and between which one of the threads is slipped and thereby is clamped. At the opposite end of the rod 18, within the frame 10, are two thread-clamping members 21 and 22, which may be of like structure and operation with those already described. A spring 23 is coiled about the rod 18, and resiliently presses against the clamping members 20 and 22, which are loose on the rod 18, to provide the resilient clamping action.

By the invention, a certain delimited length is established in the two threads, within which length the twist is taken out of the strands to separate them, the corresponding strands of the two threads, considered in pairs, are then tied together at different points along the delimited length, and the substantially exact amount of twist is reimparted to the delimited length, thereby restoring it to normal or standard appearance and strength. The clamps just described establish one end of this delimited length, and the bars 2 and 3 being movable or positionable along the frame 1, provide for varying such delimited length as desired.

At the opposite end of the delimited length of the threads or cords there are provided means (Figs. 1, 2, 5 and 10) for holding the threads and for untwisting them to separate the strands thereof, so that they may be tied together; for storing or recording the amount of twist removed; and for restoring the proper amount of twist after the various pairs of strands of the two threads have been united. As embodied, a housing structure is mounted on the frame 1, at the right hand end thereof in Fig. 1, comprising a floor 30 and vertical ends 31 and 32. A cover 33, formed as a top and two sides, is adapted to slide over the two ends 31 and 32 to constitute a completely closed housing. In front of the vertically-disposed front end 31 of the housing is a drum 35, which is fixed on shaft 36 of the motor 37. The drum 35, at its front end, has a flange 38, which flange is provided with a plurality of slots 39, adapted to receive the thread or cord, the end of which is held in the clamp 21—22. The motor 37 is mounted on the floor plate 30 of the housing. A thread or cord guide 40 of suitable form is also provided.

The clamping, untwisting and retwisting mechanism which cooperates with the thread held by the clamp 19—20 comprises a shaft 46, journaled in the housing end plate 31, and which extends alongside and parallel to the shaft 36. Fixed on shaft 46 is a clamping disk 47 and loose on shaft 46 is a cooperating beveled clamping disk 48, which is resiliently pressed against disk 47 by suitable means, such as a spring 49 coiled about shaft 46 and in compression between disk 48 and the hub of pulley 51. Pulley 51 is grooved and is fixed on shaft 46, outside the end plate 31 of the housing, and a like grooved pulley 52 is fixed on shaft 36, just behind drum 35. A belt 53 runs over the two pulleys, whereby drum 35 and clamp 47—48 are rotated in unison.

As embodied (Figs. 1, 5, 6, 7 and 8), means are provided by the invention for automatically determining or controlling the untwisting and retwisting action of the mechanism, so as to stop the untwisting when the strands of the delimited portion are separated from each other. As embodied, the shaft 46 extends backwardly and has a bearing also in the rear end plate 32 of the housing. Shaft 46 is screw-threaded, as shown at 56, for a large portion of its length within the housing, and threaded on this portion of the shaft is a traveling nut 57. Nut 57 depends downwardly and in its bottom portion is apertured, and through this aperture there passes a stationary rod 58, which rod is supported at its ends in the end plates 31 and 32 of the housing.

Thus it will be seen that when the motor 37 is running, the drum 35, clamp 47—48 and shaft 46 will all rotate together, and nut 57 will travel along the threaded portion 56 of the shaft. Means are provided for preventing the nut 57 from jamming at the ends of the screw 56 and for holding it to the end of the thread so that it will automatically begin traveling back when the direction of rotation of the motor and thereby of the screw 56 is reversed.

As embodied, at the right-hand end in Figs. 1 and 5, the screw 56 terminates short of the bearing of the shaft 46 in the end plate 32 of the housing. The end of shaft 46 is diminished in diameter and carries a loose washer or disk 59, and between this disk and the wall 32 a spring 60 is coiled in compression about the shaft 46. While this will permit the traveling nut 57 to pass off from screw 56, it will also press the nut back on to the screw when the shaft is rotated in the opposite direction. At the opposite or left-hand end in Figs. 1 and 5, the screw 56 terminates at a short distance from the wall 31 and the shaft 46 has a reduced portion 61 of less diameter than the screw 56, for the same purpose. The spring and washer device may be employed at this end also, if desired, but in practice this is not usually found to be necessary.

The foregoing mechanism together with that about to be described (Figs. 1, 5, 6, 7 and 8) constitute the automatic means for controlling the motor 37 for the untwisting. As further embodied, a switch-actuating rod 62 extends along beneath and parallel the rod 58, and is slidingly supported thereon by having one of its ends (right hand end in Fig. 5) upturned and looped over rod 58, as shown at 63. Mounted on rod 62 so as to be slidable therealong is a collar 64, and a hook 65 is fixed to and projects upwardly from the collar. This hook takes over and is slidable along the rod 58. Hooks 63 and 65 suspend rod 62 from rod 58 and permit it to slide therealong under the impulsion of traveling nut 57. The collar 64 is positionable or adjustable along rod 62 by suitable means such as a clamping screw 66 threaded into the collar to press upon the rod. A guide and support 61 is provided for rod 62.

At its forward end, switch-actuating rod 62 (Figs. 2, 6 and 7) abuts against a switch operating lever 71, which lever is adjustably pivoted or hinged at 72 upon the housing plate 31. Mounted upon the base plate 30 of the housing is a switch 73, which is operated by a cord or other suitable connection 74 extending from the switch and fixed to lever 71. An aperture 75 is formed in the lever 71 for a safety device as will be hereinafter more fully described.

The pivot point 72 of lever 71 is made adjustable along the housing, as shown by bolt and slot connection 70, in Figs. 2, 6 and 7, for the purpose of varying the pull on cord 74 for any given position of the nut 57 and stop 64, so as to allow for operating switch 73 at the proper time and also to allow sufficient play for the restoration of the switch mechanism to operative position, when the switch 64 is of the on and off type.

The switch 73 is also positionable or adjustable along the base (Figs. 1 and 9) for the same reason as switch lever 71 and cooperatively therewith, the adjustment of these two securing the necessary operating and restoring action of the switch for any relative positions of nut 57 and collar 64. That is, the switch lever 71 and the switch 73 are both positionable to assure the correct working of the switch for any set position of the stop mechanism. In the embodied form of positioning means for the switch 73, slots 79 and 80 are formed in the base plate 30, and screws 81 and 82 project through the base of the switch and through the two slots respectively, and are threaded into a clamping bar 83 beneath the base plate 30 of the housing. Thus the switch may be positioned at any point along the length of the two slots.

The manner of operation of the mechanism so far as described is substantially as follows:

The end of one of the threads to be united, is slipped into the clamp 47—48 and this thread at the other end of the delimited length is slipped into the clamp 19—20 (Figs. 1 and 22). The end of the other thread is slipped into clamp 21—22 and at the other end of the delimited length this thread is slipped into one of the slots 39 of the winding drum 35. The frame 10 may be slightly tilted forward against the spring 4 to keep the threads under tension. This pivotal and spring mounting of the clamps also permits movement to and fro to compensate for the difference in the length of the thread due to the untwisting and to the retwisting.

When the threads are thus clamped, the nut 57 is at the right hand end of its travel in Figs. 1 and 5, and the collar 64 is at the point to which the nut 57 will have advanced when the two threads are completely untwisted. To start the untwisting operation, switch 73 is thrown on by hand, which can be done by moving the lever 71, and this starts the motor 37. This rotates drum 45 and clamp 47—48 to untwist the delimited portion of the two threads (Figs. 1, 2 and 23). At the same time, the thread winds up on the drum 35, one turn for each untwisting turn in the delimited portion of the thread.

As the untwisting proceeds, nut 57 travels along screw 56 and rod 58 to the left, and finally strikes the hook 65. As collar 64 is clamped on rod 62, this moves rod 52 longitudinally to the left, and by reason of the end of the rod abutting on switch lever 71, that lever is rocked about its hinge 72, and thereby pulls on cord 74 and snaps the switch 73 and stops the motor (Figs. 6 and 7).

This leaves the strands in the delimited length of both threads entirely untwisted as shown in Fig. 23.

If for any reason nut 57 is permitted to run too far to the left, the rod 62 will not jam against lever 71 for the reason that after the switch is thrown off, due to the angular movement of the lever 71, rod 62 comes into alinement with the aperture 75 (as shown in Fig. 7) and will pass therethrough, thus preventing jamming of these parts. To prevent jamming of the nut 57 at the left hand end, it will run out on the reduced and unthreaded portion 61.

Means are provided, largely as a matter of convenience, for locating the point of forming the knot in the various pairs of strands (Figs. 1, 5 and 10) and as embodied the mechanism is equipped to tie three knots in three cord or three stranded threads. For this purpose, three pairs of supporting bars 85 and 86 extend across the frame 1, one resting upon and the other passing beneath the horizontal part of the frame 1, and being clamped thereagainst by screws 87, as shown in Fig. 3. These supporting bars are slidable longitudinally of the frame 1, whereby the distance between the parts may be changed corresponding to the lengths of the delimited portions of the thread. Pins 88 project upwardly from the respective plates 85 past the untwisted strands to serve as markers for the uniting point in the strands. If desired the pins 88 may be adjustable along the plate 85 by means of series of holes 89 formed therein.

The operative takes one strand of one of the threads and one strand of the other thread, and cuts them by the localizing aid of the corresponding pin 88, and ties them together. This is done with the strands in pairs as shown in Fig. 24.

In the embodied form of mechanism and in connection with the rewinding means, means (Figs. 1 and 10) are provided for mounting the full or new spool or reel upon the machine, and winding the cord from the drum 35 upon this spool, and preferably for driving the full spool to wind the thread from the drum 35. As embodied, a crank shaft 93 is journaled on the under side of the frame 1 beneath the forward end of the housing, and the handle 94 thereof is sufficiently long to take a full spool 95 and leave a hand grip for the machine operator. Mounted on the frame 1, beneath the housing, is a preferably continuously running motor 96, and fixed upon the shaft thereof is a friction pulley 97. A starting and stopping switch 99 and other standard or suitable connections for the motor are provided. A tray 98 is provided for the cut ends of thread.

Suitable supports may also be provided for the nearly exhausted spool, and another support for this spool after the thread has been completely unwound therefrom where it may await removal by an operative. For this purpose two spindles 100 and 101 are shown (Fig. 10) supported upon the frame 1 of the machine.

In Fig. 10 the machine is shown mounted upon its own support, comprising legs 102, 103, 104, 105 and suitable cross-bracing 106, which support may be detachable if desired, and may be secured to the frame 1 by screws or bolts or other suitable fastening means.

In Fig. 11 the machine is shown operating with a backwinder, and with its frame 1 resting upon and movable along the other mechanism, as will be later more fully described.

The further manner of operation of the described mechanism is as follows:—

In using the machine with the spool holding and operating devices as shown in Fig. 10, the nearly exhausted spool is placed by an operative on the spindle 100, and the machine operator will quickly draw off the short remainder of the thread on the spool, which spins idly on the spindle. The thread is then put in the untwisting mechanism in the manner already described. A full spool or reel has been placed on the handle 94, and its thread is passed through the slot 39 of the drum 35, and the end of this thread is passed into the clamping device 21—22 at the left hand end.

During the untwisting action, the thread is wound from the full spool 95 onto the drum 35 a number of turns equal to the twist which has been taken out of the delimited part of the thread. After the various pairs of untwisted strands have been united in the manner previously described, the machine operator takes the handle 94 and swings it to the right in Fig. 10, bringing the inner rim of the spool 95 against the friction pulley 97, and thereby unwinding the thread from the drum 35 onto the spool 95, and as the thread unwinds completely from the drum 35 it will snap out of the slot 39, and out of the clamp 19—20, or the thread is lifted from the clamp 19—20. As the number of turns of thread about drum 35 equals the number of twists taken out of the delimited length of the thread, the retwist imparted to the united thread in the delimited length will be the same as that taken out. The knots in the strands are very small and are spaced well apart; the twist in this section of thread or cord being normal, the strength and appearance are unimpaired by the joining of the two threads.

The thread is now continuous from the loom to the spool 95, which spool may be placed upon a spindle of the creel, or may be placed temporarily on spindle 101 and then on the creel spindle.

In Fig. 10 the machine has been shown and described adapted to unite the new or full spools directly to the threads coming from the loom, the new spool so united being placed upon the creel.

In Fig. 11 the machine is shown adapted to operate with a backwinder, the machine being shifted along the frame of the backwinder to bring it into operative relation with the successive spool-winding mechanisms. One instance of such use of the machine is where the backwinder is used to rewind small spools, coming from the twister, upon large spools for the creels. The machines may also be used in the manner described in connection with Fig. 10 to splice or unite the ends of the large spools coming from the backwinder with the exhausted end of the large spools.

Referring in detail to Fig. 11, the backwinder is shown with a frame 110 and with a winding drum 111 fixed on a shaft 112. A spool holder having arms 113 and a counterweight 114 are swingably supported on a shaft 115. By this mechanism the spool 116 is swung from the winding position to the inoperative position and vice versa, as desired. It will be understood that the winding drums 111 and their spools 116 are placed in series successively along their respective shafts. This mechanism in itself is not novel in the present application, and need not be described in minute detail.

Means are provided by one feature of the invention for supplying and for positioning the small-sized spools for the purpose of uniting the threads, and during the subsequent backwinding. The present preferred embodied form thereof is shown in Fig. 11, in connection with a form of the thread uniting machine adapted to cooperate both with a backwinder and with said supplying and positioning means for the small spools 120, which spools are connected to and then wound by the backwinder upon a large spool.

In the embodied form of said means, a supporting frame is provided extending along, and parallel with, the backwinder, and comprising legs 121, and holding rails 122 and 123. The small spools 120 are preferably supplied upon carriers shown as comprising a base 124, of wood or other suitable material, upon which are mounted a series of spindles 125, upon which the spools 120 are slipped. The base plates 124 are adapted to readily fit within and to be supported by the rails 122 and 123, so that they may be readily removed when the spools are emptied, and another plate 124 bearing full spools be substituted therefor.

In accordance with one feature of the invention, conveying means are provided whereby a supply of the spindle plates 124 may be carried or transported along and delivered to the supporting devices 121 wherever needed. In Fig. 14 a truck 128 is shown, carrying a plurality of the spindle plates 124 and adapted to roll along the floor from place to place for the purpose described.

When the thread-uniting machine is used for this purpose and in this manner, the frame 1 is adapted to rest upon and slide along the backwinding machine and the spindle support 121. For this purpose, suitable supporting and guiding devices are provided. As embodied, a horizontally-disposed rail 129 is mounted on the backwinding mechanism, and a like rail 130 is mounted on the spindle support, the frame 1 of the thread-uniting machine resting with one end upon one of said rails and the other end upon the other rail. Guide-pieces 131 and 132 may be provided projecting downwardly from the frame 1 to cooperate with the rail 129 to keep the thread-uniting machine in position.

In this manner of operating the machine, the thread-uniting machine is slidable from in front of one winding drum 111 to the next, and so on along the backwinding machine, the thread-uniting machine sliding along the rails 129 and 130. The operator will be seated in the chair 133, and will move the thread-uniting machine in the manner described, the operator moving along with it.

To save the time of the thread-uniting machine, that is, to keep it in as nearly continuous operation as possible, means are provided by the invention for supplying to the backwinder the large spools 116 with the thread from the first small spool already wound thereon. Thus, if the large spools take the thread from three small spools, one-third of the time of the thread-uniting machine will be saved. That is, it will not be obliged to wait for the winding onto the large spool of the thread from the first small spool, which needs no splicing.

For this purpose, as embodied, there is provided on the opposite or left-hand side of the back winder (Fig. 11), a corresponding series of winding drums 134, one drum being shown with a spool 116 in cooperation therewith, the thread from the first small spool being wound thereon. This mechanism is merely indicated in a general way, as it would be simply a duplicate of the mechanism shown at the right-hand side of the machine and already described. After the spools 116 are partially wound by the mechanism at the left-hand side of Fig. 11, to the extent of having wound thereon the thread from the first of the three small spools which they are capacitated to receive, they are taken off and dropped onto the runway 135, and will come around in position to be taken by the operator seated in the chair 133, or standing by the thread-uniting machine, and by the operator are placed on the winding mechanism on the right-hand side of the back-winder.

The manner of operation of the mechanism so far described is substantially as follows:

The supply of small spools 120 to be wound on the large spools 116 (for example, three small spools being wound as a continuous thread on one large spool after the ends are united by the thread-uniting machine) is taken care of by an attendant, who replaces a base plate 124 of empty spools by one with full spools, from time to time as the need arises.

The operation of the thread-uniting machine may be first considered at the time when a large spool 116 at the right-hand side of the back winder of Fig. 11 is just full or completed. This spool is removed and one of the spools 116 from the receptacle 135 (which spools it will be recalled have had the thread from the first small spool wound thereon by the mechanism at the left of Fig. 11) is placed in the back-winding mechanism at the right of Fig. 11. The end of the thread $t$ of the spool so placed on the backwinder is brought down under guide 138 and over guide 137 and passed through a slot 39 in the drum 35 and its end secured in the corresponding clamp of frame 10. The guide 137 is just above, or substantially just above, the winding drum 35. This keeps the thread from catching on the flange while rewinding and also lifts the thread out of the notch 39 when the retwisting is completed. This also keeps the various threads, while being wound from the spools on the spool holder onto the corresponding spools on the backwinder, above the operator's head, so that there is a clear way for the operator and the thread uniting machine to pass to and fro along the backwinding mechanisms.

The thread $t$ from a small spool 120 is brought down and its end fixed in the clamp 47—48, and this thread is also fixed in the corresponding clamp of frame 10. The two threads are then untwisted and united as already described. The spool 116 is then brought down on the winding drum 111, the thread being thereby unwound from the drum 35, which reimparts the standard degree of twist to the delimited, and now united, part of the two threads, and the thread will slip out of the slot 39 and out of the clamps to the position shown at the top of Fig. 11, the thread running around guides 136, 137 and 138 until the spool 120 is exhausted.

This operation can then be repeated with another small spool 120, whereupon the large spool 116 is full and ready to be removed from the backwinder and to be taken and united to the end of the thread from an exhausted large spool on the creel, the thread from which exhausted spool runs into the loom. As already stated, the thread uniting machine 1 will be slid along from one backwinding drum 111 and associated mechanism to another, or a sufficient number of others, to keep the thread-uniting machine fully occupied. In Fig. 11 the thread $t'$ of one spool 120 is being wound onto its spool 116, while the thread $t$ of the other spool 120 has just been united to its thread 116, preparatory to being wound thereon.

In Fig. 15 a different form of mechanism or device for holding and rotating the large spool is shown from the form shown in Fig. 10. This form is especially adaptable where the thread uniting machine is not provided with legs or other underneath supporting frame of its own.

In this embodiment, the full spool 150 is rotatably mounted upon a spindle 151, which spindle is pivotally mounted at 152 upon a bracket 153. A spring 149 tends to maintain the spool 150 in the full line position of Fig. 15. The bracket 153 is conveniently mounted on the casing of a motor 154, which motor corresponds generally to the motor 96 in Fig. 10. Motor 154 is mounted upon a support 155 just above the untwisting and retwisting mechanism.

On the shaft of motor 154 is a friction pulley 156, with which the rim of spool 150 is adapted to engage to wind onto spool 150 the thread from drum 35 during the retwisting operation, as shown in broken lines in Fig. 15, when the spindle 151 is depressed by the hand of the operator. This mechanism is in convenient relation to the winding drum 35 to unwind the thread therefrom in reimparting the twist to the thread, and so that when the thread is completely unwound from the drum, it will slip out of the slot 39.

In Fig. 16 is shown a still different form of the backwinding device, adapted for attachment to the thread-winding machine mounted upon legs or a supporting frame. In this form, a spool 160 (corresponding to spool 95 and spool 150) is carried on a spindle or rod 161, extending horizontally from the outer end of an arm 162, which arm is pivoted at 163 on a bracket 164, mounted on the side of the machine. A winding motor 165 (corresponding to motors 96 and 154) is mounted on the side of the machine support, and is provided with a friction pulley 166. The operator moves the arm 162 by hand, by grasping the end of the spindle 161, and thereby moves the spool 160 from the full line position to the dotted line position of Fig. 16, to wind the threads from the drum 35 onto the spool 160. After the rewinding is completed, the operator will swing arm 162 upwardly, and it will remain in the full line position of Fig. 16 by the action of gravity.

In Figs. 17 and 18 modified forms are shown of a part of the untwisting and retwisting mechanism, in which a full spool is carried by the untwisting mechanism, and constitutes one of the termini of the delimited thread length. This is a somewhat simplied form of the mechanism, but for general practice will probably not be as satisfactory as the form shown in Fig. 1 and the following figures.

In such modification, as embodied, a motor 170 is provided (corresponding to motor 37), and fixed on the shaft 171 of the motor is a yoke 172, which supports a spindle 173, on which spindle a full spool 174 is mounted. A detent 175 may be employed to prevent undesired rotation of the spool 174 about its own axis.

The remaining parts of the mechanism may be in their essentials the same as, or similar to, the mechanism shown in Fig. 1. In this case the spool is rotated transversely to its own axis to remove the twist from the delimited length of thread, and is then rotated in the opposite direction to reimpart the twist to the delimited length of thread, after the two threads have been united.

In Fig. 18 a similar mechanism is shown, except that in this case the spool is mounted directly on the motor shaft. The motor shaft, at its outer end, is provided with a disk 178 from which projects a spindle 179, upon which the spool is mounted, friction tight, the spindle 179 being preferably made tapering for this purpose.

A clip 180 is provided upon, or attached to one end of the spool, to hold the thread so as to cause it to untwist, and later to retwist, when motor 170 is running and the spool is thereby rotated. With this form, a reversing switch, either hand or automatic will be used, and may be of any convenient or known form, or like that shown in application Ser. No. 460,725 of Pearson and Kelly.

In Figs. 19, 20 and 21, a form of mechanism, different from that previously described is shown, for uniting the thread of full creel spools to the thread of exhausted creel spools, which latter thread is running into the loom. In this embodied form, the nearly exhausted spool 188 is removed from a spindle 189 of the creel 190, and is placed upon a spindle 192, mounted on a bed 193, which is supported on a portable frame 194. Near the spindle 192 is mounted a bracket 195, which is pivotally mounted at 196 upon the bed 193 of the machine.

At its inner end, bracket 195 is provided with an arcuate slot 197 through which passes a screw 198, which is screw-threaded into the bed 193, to limit the swing of the bracket 195. A shaft 199 is journaled at the outer end of the bracket 195, and fixed on the shaft is a grooved belt pulley 200. Fixed to shaft 199, on the top side of bracket 195 is a spool 201, and above the spool 201, and fixed thereto, is a spindle 202 of much less diameter than the spool 201. A handle 195' is preferably provided on bracket 195.

The back-winding mechanism proper comprises frame pieces 203, supported by the bed 193 and projecting upwardly at either side thereof. A winding drum 204 is fixed on a shaft 205, which shaft is journaled in the frame side pieces 203. Fixed to one end of shaft 205 is a grooved pulley 206, and a driving belt 207 runs from pulley 206 over pulley 200 to drive spool 201 and spindle 202.

To the opposite end of shaft 205 is fixed a belt pulley 208, over which runs a belt 209. Belt 209 also runs over a belt pulley 210, mounted on the shaft 211 of a motor 212, which motor is mounted on the underside of the bed plate 193 of the machine. The spool-holder comprises arms 213, projecting from a body 214, which body is pivotally mounted on the side plates 203. The spool is removably carried on a spindle 216, mounted in the arms 213. A counterweight 215 is also mounted on the body 214 either to hold the spool to the winding drum 204 or to hold it in inoperative position, raised away from the drum, as indicated in broken lines in Fig. 19. The thread-uniting machine is indicated by reference numeral 1, and is shown located just in front of the backwinding mechanism.

The manner of operation of the mechanism just described is substantially as follows:

The nearly exhausted spool 188 is removed from spindle 189 of the creel 190 (Fig. 21) and is placed upon the spindle 192. The thread is taken by the hand of the operator close to the spool 188 on spindle 192, and is wrapped for a few turns around spool 201 in one direction, and then around spindle 202 in the opposite direction. At this time the pivoted bracket 195 is in such position that belt 207 is loose and does not rotate pulley 200. The operator now grasps the handle 215 and swings bracket 195 so as to tighten belt 207, thereby rotating the spool and spindle and taking up the slack in the thread leading away to the loom 191, and winding onto the spool 200 all of the thread from the spent spool 188.

The end just unwound from the spool 188 is to be united to the end of the thread of a full spool 217, which is in the inoperative position on the backwinder. The ends of the two threads are united in the manner already described by the thread-uniting machine 1, and thereupon the spool 217 is dropped upon the winding drum 204 to unwind the thread from the winding drum 35, the pin 219 serving as a guide. The spool 217 may then be placed upon a spindle 189 of a creel 190 to be drawn into the loom during the weaving until exhausted. This form of mechanism is both portable and obviates the disadvantage of having the thread or cord piled or deposited loosely upon the floor.

Referring further to Fig. 19, the mechanism can be operated in another manner, namely:

The nearly exhausted spool is taken from one of the creel spindles 189 and is placed upon the spindle 192. The thread between the loom and spool is slipped into the holding device 187, which may be a pigtail hook 187 or other suitable holding device, and the portion of the thread between this holding device and the spool is twisted by hand about the spool 201 and is slipped into the notch 186 in the top flange of the spool. The spool 201 is then rotated to unwind the thread completely from the creel spool on spindle 192, and the free end is then spliced in the manner already described. The backwinder first unwinding the thread from the drum 35 of the thread uniting machine to restore the twist in the splice or union which has just been made in the thread and then unwinding the thread from spool 201. The spool on the backwinder is thereby united with the thread coming into the loom and may be placed upon the spindle 189 in the usual manner, and as already described. During the rotation in the first direction of the spool 201 a certain amount of twist has been imparted to or taken out of the thread between the notch 186 and the hook 187, but as the spool 201 rotates in the opposite direction during the unwinding an equal number of turns, the twist in this part of the thread is normal or standard when the operation is finished.

In Figs. 22 to 26 inclusive there is shown, largely diagrammatically, the operation of the thread-uniting device as shown in Figs. 1 to 10 in connection with the creels and loom, much of the details of this description having already been given.

A loom 130 is shown supplied by two double creels 131 and 132, each provided on both sides with a series of rows of spindles 133, the spindles, it will be understood, being in both horizontal and vertical rows, and usually passing into the loom 130 in one general horizontal direction.

In Fig. 22 at the top, a nearly depleted spool 134 has been taken from the creel spindle 133 and placed upon the supporting spindle 100 (Figs. 10 and 22) of the thread uniting machine. In the lower part of Fig. 22 the thread has been completely unwound from the spool 134 and the thread has been placed in position to be untwisted in the thread-uniting machine 1. A fresh or full spool 134 is mounted on swinging spindle 94, (Figs. 10 and 22) with its thread likewise in position to be untwisted.

In Fig. 23 the mechanism and thread is shown with the three strands $a$, $b$ and $c$ of one thread and $x$, $y$ and $z$ of the other thread at the completion of the untwisting operation. In Fig. 24 the threads are shown, diagrammatically, united in pairs, and the operator beginning to backwind or unwind the thread from the drum 35 to reimpart the correct degree of twist to the so united pairs of strands. In Fig. 24 the knots in the strands are indicated, but in practice they are sufficiently small to be negligible in the retwisted thread.

Fig. 25 shows the mechanism at the completion of the retwisting operation, the two threads having been united by their strands in pairs and the twist having been imparted thereto in the same manner and degree as in the other part of the thread or cord. In Fig. 26 the full spool 134 has been moved to the supporting spindle 101 (see also Fig. 10) and is now united to the thread leading into the loom, and from spindle 101 it is placed upon the empty creel spindle 133, as shown at 134$^a$, and the thread therefrom is drawn into the loom until the spool is nearly exhausted. The mechanism in the condition of Fig. 26 is ready to proceed again with the cycle of operations already described.

In Figs. 27 to 34 a modified form of the machine is shown, the principal difference being in the construction of the automatic control for the untwisting mechanism, whereby it is stopped after the entire amount of twist has been removed from the delimited length of the threads. In this form of the device, a screw shaft 240 (corresponding in function to screw shaft 56 of Figs. 1 and 5) is a continuation of the shaft 36 of the winding motor 241 (corresponding to motor 37 of Fig. 1). In this case, by reason of this arrangement of the automatic throw-off of the untwisting mechanism, the shaft 46 is merely a short shaft journaled in the front plate 31 of the housing. Most of the remaining parts of the machine are the same in structure as the machine shown in Fig. 1 and the following figures, and need not be described in detail. In this modification, the general frame of the machine is shown consisting of piping 242, although for most uses the angle-iron frame will be found preferable.

The mounting for the frame 10 will be noted from Figs. 27 and 29. A sleeve 244 encircles the pipe 242 of the side frame, and is fixed in place by a clamping screw 245. A rod 246 is fixed to the sleeve 244, and the frame 10 is pivotally mounted on the rod 46 in the manner already described in connection with Figs. 1 and 4.

Fig. 36 shows one form of mounting the spool spindle on the thread or spool support, whether mounted directly on the support or on a spool base. An angle 250, which may be a part of the spool support or of a spool base carried by the support has an angle 251 fastened thereto, as by rivets 252, with the outwardly extending flanges separated from each other. The spindle 253 fits snugly in a hole in the top flange and is screw-threaded into a hole in the bottom flange. The spindle is thereby reenforced and protected against shearing or breaking strain when threaded into the flange.

In practice, the relatively small sized spools come from the twisters or twisting mechanisms (which put the final twist in the threads or cords) and are backwound upon the relatively large spools, and these large spools are employed in the creels to feed the loom. In practice, frequently three of the relatively small spools are wound onto one of the large spools, as for instance, three four-inch spools will be wound onto one five and one-half inch spool, the small spools coming from the twister, and during the re-winding their threads are united end to end as they are successively wound onto the large spool by the backwinder. This operation is expedited, as already explained, so far as the thread-uniting machine is concerned, by winding the thread of the first of the three small spools onto the large spool in a different backwinding mechanism, as the front end of this thread does not require uniting or splicing.

Among the advantages of this mechanism and method of operating upon the thread is the attainment of higher loom efficiency, that is, relative operating time of loom. It also provides an opportunity for inspecting the yarn or thread as it is unwound at the backwinder before going to the loom. The thread guide shows up the imperfections as the thread runs thereover. The gain in loom efficiency is due largely to the reduction in the number of splices or thread unions at the loom, and through the absence of hurry the splicing is more carefully done, in addition to the gain in thread quality through the improved manner of forming the knots and re-establishing the correct amount of twist. It is desirable also to run the creels so that a definite proportion and distribution of the spools will become exhausted on each of a given number of successive days, whereby the splices or thread unions are uniformly scattered through the fabric, although this is of relatively less importance with the improved splice or thread union provided by the present invention. For example, the use on the creels of the small spools which come from the twisters would necessitate the tying of three times as many knots and the removal and replacement of three times as many spools at the creels. This would greatly increase not only the labor, but also the chances of stopping the loom and would produce hurry and consequently deterioration in the work.

The invention in its broader aspects is not limited to the specific mechanisms shown and described but departures may be made therefrom within the scope of the accompanying claims without departing from the principles of the invention and without sacrificing its chief advantages.

What I claim is:—

1. A mechanism for uniting threads or cords including in combination means for untwisting the strands of thread, a driving motor therefor, a switch for the motor, a member traveling proportionately to the untwisting, a circuit opening device for the motor circuit operated by the traveling member, and means for taking care of possible over-travel of said traveling member.

2. A mechanism for uniting threads or cords including in combination means for untwisting the strands of threads, a driving motor therefor, a switch for the motor, a member traveling proportionately to the untwisting, a circuit opening device for the motor circuit operated by the traveling member, and means for allowing possible over-travel of said traveling member.

3. A mechanism for uniting threads or cords including in combination means for untwisting the strands of thread, a driving motor therefor, a switch for the motor, a shaft rotating proportionately to the untwisting means, a nut traveling on said shaft and acting to operate said switch when the untwisting is complete, and means for permitting possible over-travel of said nut.

4. A mechanism for uniting threads or cords including in combination means for untwisting the strands of thread, a driving motor therefor, a switch for the motor, a shaft rotating proportionately to the untwisting means, a nut traveling on said shaft, a lever actuated by said traveling nut for operating said switch, and means for permitting possible over-travel of the nut after the switch has been operated to stop the motor.

5. A mechanism for uniting threads or cords including in combination means for untwisting the strands of thread, a driving motor therefor, a switch for the motor, a rod moving longitudinally when the untwisting is completed, a pivoted switch lever on which the end of the rod abuts, the lever having an aperture coming into registry with the rod when the switch lever is open, to permit possible further movement of the rod.

6. A mechanism for uniting threads or cords including in combination means for untwisting the strands of thread, a motor therefor, a switch for the motor, a screw shaft rotating proportionately to the untwisting, a nut traveling on the screw shaft, the end of the screw shaft being of less diameter than the screw-thread and a spring permitting the nut to leave the screw-thread but yieldingly pressing it onto the screw-thread.

7. A mechanism for uniting threads or cords including in combination an open frame, thread clamps movably mounted on the frame, a motor and thread untwisting devices mounted at one end of said frame, and a supporting structure attachable to and detachable from said frame.

8. A mechanism for uniting threads or cords including in combination a thread uniting mechanism, including means for untwisting and retwisting a part of the thread, means for storing the quantity of untwisting in another part of the thread, and means for winding the stored part of the thread during said retwisting.

9. A mechanism for uniting threads or cords including in combination a thread uniting mechanism, including means for untwisting and retwisting a part of the thread, means for storing the quantity of untwisting in another part of the thread, a spool support, and means for winding the stored part of the thread upon the spool during said retwisting.

10. A mechanism for uniting threads or cords including in combination a thread uniting mechanism, including means for untwisting and retwisting a part of the thread, means for storing the quantity of untwisting in another part of the thread, and means called into operation by an attendant for winding the stored part of the thread during said retwisting.

11. A mechanism for uniting threads or cords including in combination a thread uniting mechanism, including means for untwisting and retwisting a part of the thread, means for storing the quantity of untwisting in another part of the thread, a spool support, and means called into operation by an attendant for winding the stored part of the thread upon the spool during said retwisting.

12. A mechanism for uniting threads or cords including in combination a thread uniting mechanism, including means for untwisting and retwisting a part of the thread, means for winding a part of the thread proportional to the untwisting to store the amount of the untwisting, and means for unwinding the stored thread to impart the correct amount of twist to the united part of the threads.

13. A mechanism for uniting threads or cords including in combination a thread uniting mechanism, including means for untwisting and retwisting a part of the thread, means for winding a part of the thread proportional to the untwisting to store the amount of the untwisting, and means for unwinding the stored thread onto a spool to impart the correct amount of twist to the united part of the threads.

14. A mechanism for uniting threads or cords including in combination a thread uniting mechanism, including means for untwisting and retwisting a part of the thread, means for winding a part of the thread proportional to the untwisting to store the amount of the untwisting, and means called into operation by the attendant for unwinding the stored thread to impart the correct amount of twist to the united part of the threads.

15. A mechanism for uniting threads or cords including in combination a thread uniting mechanism adapted to unite the end of the thread from a spool, including means for untwisting and retwisting a part of the thread, means for winding a part of the thread proportional to the untwisting to store the amount of the untwisting, and means for unwinding the stored thread onto said spool to impart the correct amount of twist to the united part of the threads.

16. A mechanism for uniting threads or cords including in combination a thread uniting mechanism, including means for untwisting and retwisting a part of the thread, a drum rotating in unison with the untwisting means and winding the thread thereon to store the amount of the untwisting, and means for unwinding the thread from the drum to impart the correct amount of retwist to the united threads.

17. A mechanism for uniting threads or cords including in combination a thread uniting mechanism, including means for untwisting and retwisting a part of the thread, a drum rotating in unison with the untwisting means and winding the thread thereon to store the amount of the untwisting, and means for unwinding the thread from the drum onto a spool to impart the correct amount of retwist to the united threads.

18. A mechanism for uniting threads or cords including in combination a thread uniting mechanism adapted to unite the end of the thread from a spool, including means for untwisting and retwisting a part of the thread, a drum rotating in unison with the untwisting means and winding the thread thereon to store the amount of the untwisting, and means for unwinding the thread from the drum onto said spool to impart the correct amount of retwist to the united threads.

19. A mechanism for uniting threads or cords including in combination a thread uniting mechanism, including means for untwisting and retwisting a part of the thread, a drum rotating in unison with the untwisting means and winding the thread thereon to store the amount of the untwisting, and means called into operation by an attendant for unwinding the thread from the drum to impart the correct amount of retwist to the united threads.

20. A mechanism for uniting threads or cords including in combination a thread uniting mechanism adapted to unite the end of the thread from a spool, including means for untwisting and retwisting a part of the thread, a drum rotating in unison with the untwisting means and winding the thread thereon to store the amount of the untwisting, and means called into operation by an attendant for unwinding the thread from the drum onto said spool to impart the correct amount of retwist to the united threads.

21. A mechanism for uniting threads or cords including in combination means for untwisting the thread including a thread holding device and means for permitting said holding device to yield lengthwise of the thread to allow for the untwisting of the thread.

22. A mechanism for uniting threads or cords including in combination means for untwisting and retwisting the thread including a thread holding device and means for permitting said holding device to yield lengthwise of the thread to allow for the untwisting and retwisting of the thread.

23. A mechanism for uniting threads or cords including in combination means for untwisting the thread including a device for establishing a delimited part of the thread and means for permitting said holding device to yield lengthwise of the thread to allow for the untwisting of the thread.

24. A mechanism for uniting threads or cords including in combination means for untwisting and retwisting the thread including a device for establishing a delimited part of the thread and means for permitting said holding device to yield lengthwise of the thread to allow for the untwisting and retwisting of the thread.

25. A mechanism for uniting threads or cords including in combination means for untwisting the thread including a thread holding device and means for permitting said holding device to resiliently yield lengthwise of the thread to allow for the untwisting of the thread.

26. A mechanism for uniting threads or cords including in combination means for untwisting and retwisting the thread including a thread holding device and means for permitting said holding device to resiliently yield lengthwise of the thread to allow for the untwisting and retwisting of the thread.

27. A mechanism for uniting threads or cords including in combination means for untwisting the thread including a device for establishing a delimited part of the thread and means for permitting said holding device to resiliently yield lengthwise of the thread to allow for the untwisting of the thread.

28. A mechanism for uniting threads or cords including in combination means for untwisting and retwisting the thread including a device for establishing a delimited part of the thread and means for permitting said holding device to resiliently yield lengthwise of the thread to allow for the untwisting and retwisting of the thread.

29. A mechanism for uniting threads or cords including in combination a frame, untwisting mechanism, and knot pins for the untwisted thread strands, and supports therefor movable upon the frame.

30. A mechanism for uniting threads or cords including in combination a frame, untwisting mechanism, and knot pins for the untwisted thread strands, and a plurality of supports therefor movable relatively to each other upon the frame.

31. A mechanism for uniting threads or cords including in combination means for storing the threads from a nearly exhausted spool, and means for uniting the thread end thereby freed with the thread from another spool.

32. A mechanism for uniting threads or cords including in combination means for untwisting the strands of a thread and for simultaneously putting a reverse twist in another part of the thread, and means for controlling the action of the untwisting means comprising a member traveling proportionately to the untwisting action upon the thread and a member cooperating therewith and manually movable to a plurality of positions to vary the action of the controlling means.

33. A mechanism for uniting threads or cords including in combination means for untwisting the strands of a thread a certain amount, means for simultaneously putting the same amount of reverse twist in another part of the thread, and means for controlling the action of the untwisting means comprising a member traveling proportionately to the untwisting action upon the thread and a member cooperating therewith to stop the untwisting and manually movable to a plurality of positions to vary the action of the controlling means.

34. A mechanism for uniting threads or cords including in combination means for untwisting the strands of a thread and means for controlling the action of the untwisting means comprising a threaded shaft and a member traveling thereon proportionately to the untwisting action upon the thread and a member operated thereby and manually movable to a plurality of positions to vary the action of the controlling means.

35. A mechanism for uniting threads or cords including in combination means for untwisting the strands of a thread and for simultaneously putting a reverse twist in another part of the thread, and means for controlling the action of the untwisting means comprising a threaded shaft and a member traveling thereon proportionately to the untwisting action upon the thread and a member operated thereby to stop the untwisting and manually movable to a plurality of positions to vary the action of the controlling means.

36. A mechanism for uniting threads or cords, comprising a pair of twisting and untwisting mechanisms provided with thread engaging elements, an electric motor directly driving one of said mechanisms, and connected to drive the other and settable means for stopping the motor after it has untwisted the thread or cord a certain amount.

37. A mechanism for uniting threads or cords, comprising a pair of twisting and untwisting mechanisms turning on horizontal shafts and provided with thread engaging elements, an electric motor having its shaft concentric with one of said mechanisms for driving it directly, and a driving connection from one of said mechanisms to the other.

38. A mechanism for uniting threads or cords including in combination means for untwisting the strands of two threads including a shaft and a thread-holding device mounted thereon, a second shaft and a thread-holding device mounted thereon, means for rotating and stopping said shafts including a screw-thread formed on one of said shafts, a motor connected to one of said shafts, and means operated by the screw-shaft for stopping said motor.

39. A mechanism for uniting threads or cords including in combination means for untwisting the strands of two threads including a shaft and a thread-holding device mounted thereon, a second shaft and a thread-holding device mounted thereon, means for rotating and stopping said shafts including a screw-thread formed on one of said shafts, a motor connected to the other of said shafts, and means operated by the screw-shaft for stopping said motor.

40. A mechanism for uniting threads or cords including in combination means for untwisting the strands of two threads including a shaft and a thread-holding device mounted thereon, a second shaft and a thread-holding device mounted thereon, and means for rotating and stopping said shafts including a screw-thread formed on one of said shafts, a motor connected to one of said shafts, a switch for controlling the motor, and a traveling nut on the screw shaft for operating the switch.

41. A mechanism for uniting threads or cords including in combination means for untwisting the strands of thread, a driving motor therefor, a switch for the motor, a rod moving longitudinally when the untwisting is completed, and a switch-operating lever operated by the longitudinal movement of the rod.

42. A mechanism for uniting threads or cords including in combination means for untwisting the strands of a thread and means for controlling the action of the untwisting means comprising a driving motor, a member moving proportionately to the untwisting, and a motor switch operated by said proportionately moving member, the switch being movable into a plurality of positions to vary the switch-operating action of said proportionately traveling member.

43. A mechanism for uniting threads or cords including in combination means for untwisting the strands of a thread and means for controlling the action of the untwisting means comprising a driving motor, a shaft rotating proportionately to the untwisting action, a nut traveling on said shaft, and a motor switch operated by said nut.

44. A mechanism for uniting threads or cords including in combination means for untwisting the strands of a thread and means for controlling the action of the untwisting means comprising a driving motor, a shaft rotating proportionately to the untwisting action, a nut traveling on said shaft, and a motor switch operated by said nut, said switch being movable into a plurality of positions in cooperation with the switch-operating action of the traveling nut.

45. A mechanism for uniting threads or cords, comprising a pair of twisting and untwisting mechanisms provided with thread engaging elements, an electric motor directly driving one of said mechanisms and connected to drive the other, a threaded shaft directly driven by the other of said mechanisms, and means controlled by the threaded shaft, for controlling the operation of the motor.

46. A mechanism for uniting threads or cords, comprising a pair of twisting and untwisting mechanisms provided with thread engaging elements, an electric motor directly driving one of said mechanisms, and connected to drive the other, a switch for controlling the motor, a threaded shaft driven by the other of said mechanisms, and means, movable along the threaded shaft upon rotation thereof, for controlling the switch.

47. A mechanism for uniting threads or cords, comprising a pair of twisting and untwisting mechanisms provided with thread engaging elements, an electric motor directly driving one of said mechanisms and connected to drive the other, a threaded shaft driven by the other of said mechanisms, a switch movable in a direction parallel with the threaded shaft, means for securing the switch in a desired adjusted position, and means, movable along the threaded shaft upon rotation thereof, for controlling the switch.

48. A mechanism for uniting threads or cords including in combination means for untwisting the strands of thread, a driving motor therefor, a switch for the motor, a screw rod rotating proportionately to the untwisting, a rod parallel thereto, a nut traveling along both said rods, a longitudinally movable rod parallel to said rods, and a stop thereon in the path of the nut, and a switch lever operated by the longitudinally movable rod.

49. A mechanism for uniting threads or cords including in combination means for untwisting the strands of thread, a driving motor therefor, a switch for the motor, a screw rod rotating proportionately to the untwisting, a rod parallel thereto, a nut traveling along both said rods, a longitudinally movable rod parallel to said rods, and a stop longitudinally adjustable thereon in the path of the nut, and a switch lever operated by the longitudinally movable rod.

50. A mechanism for uniting threads or cords, comprising a pair of twisting and untwisting mechanisms provided with thread engaging elements, an electric motor for rotating said elements, and means for controlling the operation of the motor, all of said parts being substantially on the same level and readily accessible.

51. A mechanism for uniting threads or cords, comprising a pair of twisting and untwisting mechanisms provided with thread engaging elements, an electric motor for rotating said elements, a switch for the motor, and means, controlled by the amount of rotation imparted to the said mechanisms, for controlling said switch, all of the mentioned parts being substantially on the same level and readily accessible.

52. A mechanism for uniting threads or cords, comprising a pair of twisting and untwisting mechanisms provided with thread engaging elements, an electric motor for rotating said elements, a switch for the motor, a threaded shaft rotatable proportionately to the rotation of the said mechanisms, means, movable along the threaded shaft upon rotation thereof for controlling the operation of the motor, and a table on the top of which all of the mentioned parts are carried on substantially the same level.

53. A mechanism for uniting threads or cords, comprising a pair of twisting and untwisting mechanisms provided with thread engaging elements, an electric motor directly connected for driving one of said elements, a threaded shaft driven by the other of said elements, the shaft of the motor and the threaded shaft being substantially parallel, a driving connection between said elements, and means, controlled by the threaded shaft, for controlling the operation of the motor.

54. A mechanism for uniting threads or cords, comprising twisting and untwisting mechanism, a plurality of knot pins cooperating therewith, and means for adjustably positioning the knot pins.

55. A mechanism for uniting threads or cords, comprising a frame, twisting and untwisting mechanism carried thereby, a plurality of supports carried on the frame, and knots pins carried by the respective supports and individually adjustable thereon.

56. A mechanism for uniting threads or cords, comprising a frame, twisting and untwisting mechanism carried thereby, a plurality of supports carried on the frame and longitudinally adjustable therealong, and knot pins carried by the respective supports and individually adjustable thereon.

57. A mechanism for uniting threads or cords, comprising twisting and untwisting mechanism, means associated therewith for delimiting variable lengths of thread, and knot pins adjustably positioned for cooperation with the said mechanism.

58. A mechanism for uniting threads or cords, comprising a twisting and untwisting mechanism, thread clamping mechanism for delimiting lengths of thread, supports for the thread clamping mechanism movable back and forth for varying the lengths of thread delimited, and knot pins also movable back and forth cooperating with the delimiting mechanism.

59. A mechanism for uniting threads or cords, comprising a twisting and untwisting mechanism, thread clamping mechanism for delimiting lengths of thread, supports for the thread clamping mechanism movable back and forth for varying the lengths of thread delimited, and knot pins, the positions of which may be varied longitudinally and laterally.

60. A mechanism for uniting threads or cords, comprising mechanism for delimiting and untwisting two lengths of thread, a support for a spool on which one of the threads is wound, and means for rotating said spool while it remains on said support for winding up the united thread thereon.

61. A mechanism for uniting threads or cords, comprising mechanism for delimiting and untwisting two lengths of thread, a support for a spool on which one of the threads is wound, a continuously rotating element, and means for bringing the spool and rotating element into engagement intermittently for winding up the united thread on the spool.

62. A mechanism for uniting threads or cords, comprising mechanism for delimiting and untwisting two lengths of thread, a movable support for a spool on which one of the threads is wound, a rotating element, and means for moving the spool into contact with the rotating element for winding up the united thread on the spool.

63. A mechanism for uniting threads or cords, comprising mechanism for delimiting and untwisting two lengths of thread, a support for a nearly empty spool, a support for holding a full spool during the thread uniting operation, and means for rotating the full spool while it remains on its support for winding the united thread thereon.

64. A mechanism for filling large spools with continuous lengths of thread, comprising a rack for holding a plurality of small spools in a position accessible to an operator, for furnishing a continuous supply of small spools to the operator, means for winding a length of thread from a small spool onto a large spool, means for holding and intermittently rotating a large spool on which a length of thread is being wound, means for uniting successive lengths of thread from the small spools to the thread on the large spool located between the spool rack and the winding means, and thread guiding means for guiding the thread from a small spool to the large spool well above the thread uniting mechanism.

65. In an apparatus for uniting the ends of threads or cords, the combination of backwinding mechanism for carrying a large spool, a rack for carrying a plurality of small spools, and a mechanism for delimiting and untwisting a thread from the large spool and a thread from one of the small spools, said delimiting and untwisting mechanism being provided with means for preventing backtwist of the thread or cord outside of the delimited length, freely movable back and forth between the backwinding mechanism and the spool rack.

66. In an apparatus for uniting the ends of threads or cords, the combination of a plurality of backwinding mechanisms, a rack for a plurality of small spools, the rack being movable back and forth along the backwinding mechanisms for furnishing a continuous supply of small spools to an operator engaged at any of the backwinding mechanisms and a thread uniting mechanism freely movable back and forth between the backwinding mechanism and the spool rack into cooperative relationship with any desired backwinding mechanisms.

67. In an apparatus for uniting the ends of threads or cords, the combination of a plurality of backwinding mechanisms, a rack for a plurality of small spools, the rack being movable back and forth along the backwinding mechanisms for furnishing a continuous supply of small spools to an operator engaged at any of the backwinding mechanisms separated from the backwinding mechanisms by a distance sufficient to accommodate a thread uniting device and an operator, and a thread uniting device freely movable back and forth between the backwinding mechanisms and the spool rack into cooperative relationship with any desired backwinding mechanisms.

68. In an apparatus for uniting the ends of threads or cords, the combination of a plurality of backwinding mechanisms, a rack for a plurality of small spools the rack being movable back and forth along the backwinding mechanisms for furnishing a continuous supply of small spools to an operator engaged at any of the backwinding mechanisms separated from the backwinding mechanisms by a distance sufficient to accommodate a thread uniting device and an operator, means for guiding the thread over the head of the operator and a thread uniting device movable manually into operative relation with any one of the backwinding mechanisms.

69. In an apparatus for uniting the ends of threads or cords, the combination of a backwinder, a movable rack for a series of small spools for furnishing a continuous supply of small spools to an operator engaged at any point along the backwinder, separated from the backwinder by a distance sufficient to accommodate a thread uniting device and an operator, and a thread uniting device movable back and forth along the backwinder.

70. In an apparatus for uniting the ends of threads or cords, the combination of a backwinder, a movable rack for a series of small spools for furnishing a continuous supply of small spools to an operator engaged at any point along the backwinder, separated from the backwinder by a distance sufficient to accommodate a thread uniting device and an operator, and a thread uniting device, supported on the backwinder and movable therealong into operative relation with any of the spools on the backwinder.

71. In an apparatus for uniting the ends of threads or cords, the combination of a backwinder, a movable rack for a series of small spools for furnishing a continuous supply of small spools to an operator engaged at any point along the backwinder, separated from the backwinder by a distance sufficient to accommodate a thread uniting device and an operator, and a thread uniting device, supported on the backwinder and movable therealong into operative relation with any of the spools on the backwinder, the thread uniting device being also supported on the movable spool rack.

72. In an apparatus for uniting the ends of threads or cords, the combination of a backwinder provided with means for winding a first length of thread on a large spool and also provided with means for winding additional lengths of thread on a second large spool, and a thread uniting device for uniting additional lengths of thread to the second spool.

73. In an apparatus for uniting the ends of threads or cords, the combination of a backwinder provided with means for winding a first length of thread on a large spool and also provided with means for winding additional lengths of thread on a second large spool, a runway for storing the spools on which the first lengths have been wound, and a thread uniting device for uniting additional lengths of thread to the second spool.

74. In an apparatus for uniting the ends of threads or cords, the combination of a backwinder provided with means for winding a first length of thread on a large spool and also provided with means for winding additional lengths of thread on a second large spool, a manually operated thread uniting device for uniting additional lengths of thread to the second spool, and a runway, accessible to the operator of the thread uniting device, for storing the spools on which the first lengths have been wound.

75. In combination with a loom, a creel for holding spools for feeding threads into the loom, and a portable frame for receiving a nearly empty creel spool, said portable frame being provided with a full spool, and with a thread uniting device for uniting a loom thread to the thread on the full spool.

76. In combination with a loom, a creel for holding spools for the loom threads, and a portable frame carrying a spindle for receiving a creel spool, the frame also being provided with a spool holding bracket, with a full spool, with means for rotating the full spool, and with a thread uniting device for uniting the loom or creel thread to the thread on the full spool.

77. In combination with a loom, mechanism for uniting successive lengths of thread from a plurality of small spools and winding the united lengths of thread onto a large spool, and means for holding the large spools for feeding the thread into the loom.

78. In combination with a loom, a device for holding a nearly empty spool and a full spool, means for uniting the thread ends on said two spools, means for rotating the full spool for winding the united threads thereon, and means for holding the full spool for feeding its thread into the loom.

79. In combination with a loom, means for holding nearly empty and full spools, respecively, means for rotating said spool holders, and means for uniting the thread ends of respective spools.

80. In combination with a loom, means for holding nearly empty and full spools, respectively, means for intermittently rotating said spool holders, and means for uniting the thread ends of respective spools.

81. In combination with a loom, means for holding a nearly empty spool, means for holding a full spool, means for uniting the thread ends of the respective spools, and separate manually controlled means for rotating the respective spools.

82. In combination, a portable frame, a backwinding device for a spool, a bracket for holding a nearly empty spool, and a thread uniting device for uniting the thread ends of respective spools, the mentioned parts being all carried on the portable frame.

83. In combination on a portable frame, a backwinding device for holding a full spool, a rotatable bracket for holding a nearly empty spool, means for rotating the backwinding device and the bracket, and a thread uniting device for uniting the thread ends of respective spools.

84. In combination on a portable frame, a backwinding device for holding a full spool, a rotatable bracket for holding a nearly empty spool, manually controlled means for intermittently rotating the backwinding device and the bracket, and a thread uniting device for uniting the thread ends of respective spools.

85. In combination on a portable frame, a spindle, a rotatable bracket for a nearly empty spool, a backwinder for winding a full spool, and a thread uniting device for uniting the thread ends from the spools on the bracket and backwinder.

86. In combination on a portable frame, a spindle, a rotatable bracket for a nearly empty spool, manually controlled means for rotating said bracket, a backwinder for a full spool, manually controlled means for rotating the backwinder, and a thread uniting device for uniting threads from the said spools.

In testimony whereof, I have signed my name to this specification.

TIMOTHY J. KELLY.